May 31, 1960     D. N. JUDELSON     2,938,733
CHUCK WITH ROLL END PENETRATING AND GRIPPING PAWLS
Filed Nov. 4, 1957     3 Sheets-Sheet 1
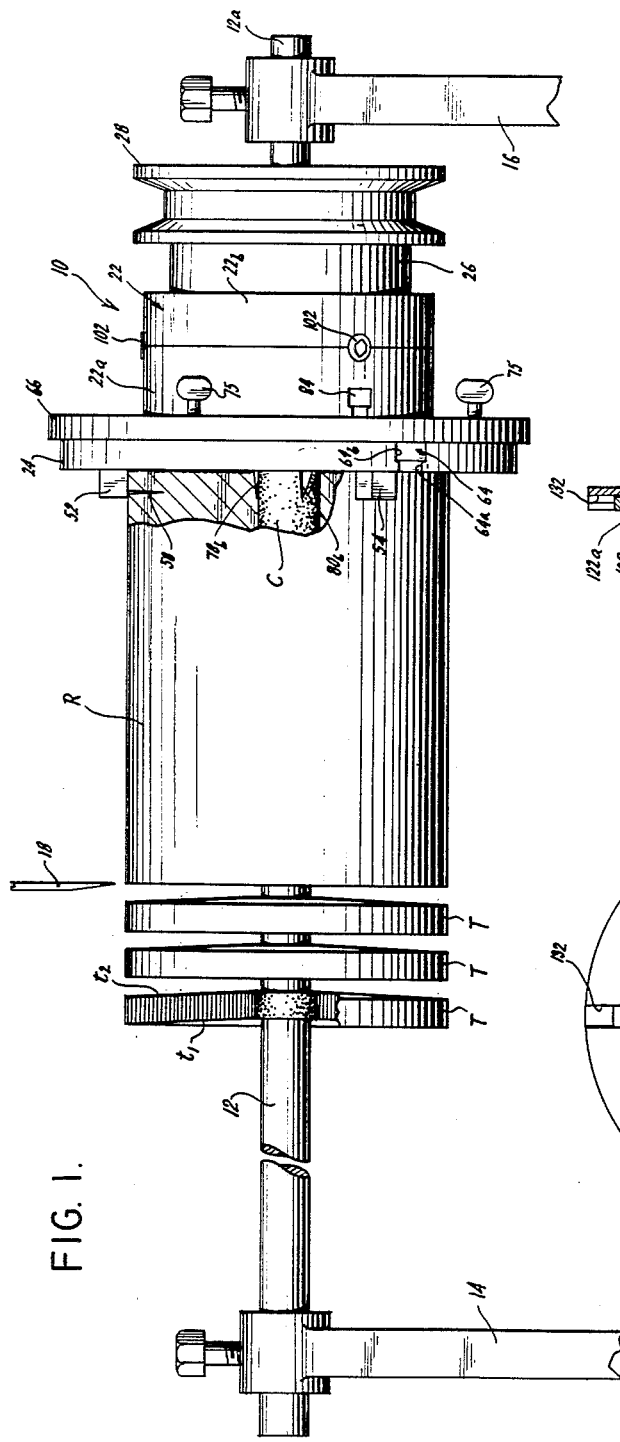
FIG. 1.
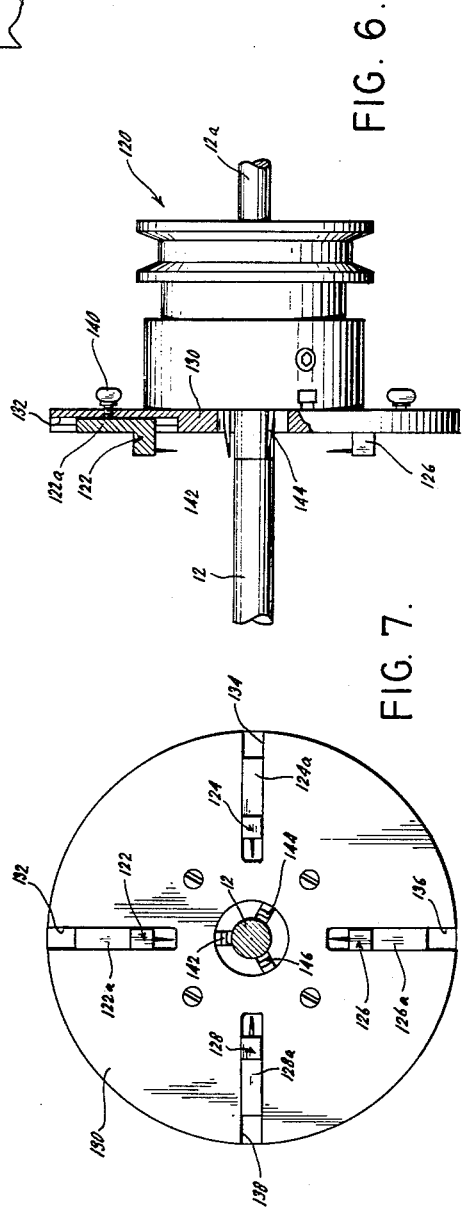
FIG. 6.
FIG. 7.
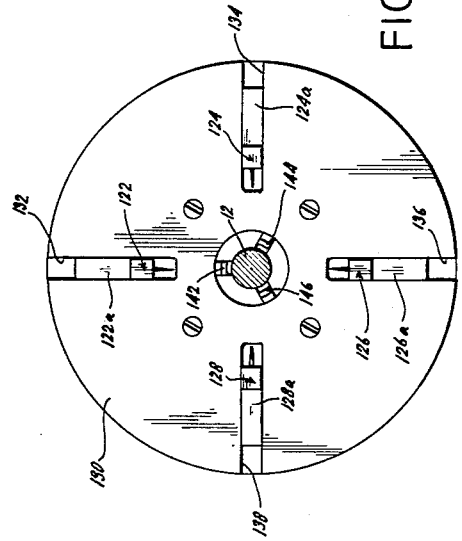
INVENTOR.
DAVID N. JUDELSON
BY
*Amster & Levy*
ATTORNEYS May 31, 1960 D. N. JUDELSON 2,938,733
CHUCK WITH ROLL END PENETRATING AND GRIPPING PAWLS
Filed Nov. 4, 1957 3 Sheets-Sheet 2

INVENTOR.
DAVID N. JUDELSON
BY Amster & Levy
ATTORNEYS

May 31, 1960  D. N. JUDELSON  2,938,733
CHUCK WITH ROLL END PENETRATING AND GRIPPING PAWLS
Filed Nov. 4, 1957  3 Sheets-Sheet 3

INVENTOR.
DAVID N. JUDELSON
BY Amster + Levy
ATTORNEYS

United States Patent Office 2,938,733
Patented May 31, 1960

2,938,733
CHUCK WITH ROLL END PENETRATING AND GRIPPING PAWLS
David N. Judelson, 415 W. 23rd St., New York, N.Y.
Filed Nov. 4, 1957, Ser. No. 694,169
14 Claims. (Cl. 279—2)

The present invention relates generally to machines for cutting materials such as cloth, paper and the like, and in particular to an improved chuck for rotating a roll of material in such cutting machines.

It is generally known to provide a rotary knife cutting machine of the type in which a roll of material is rotated on a longitudinal supporting shaft or spindle on the machine frame, which roll is parted or cut into strips of a prescribed width by the action of a high speed rotary knife. These machines fall into two general categories, those in which the roll of material is moved longitudinally relative to the knife between successive cutting cycles, and those in which the knife is moved longitudinally relative to the roll of material during successive cutting cycles. In my United States Patent No. 2,457,310 of December 28, 1948, there is illustrated a machine of the latter type in which the roll of material is rotated about a longitudinal supporting shaft fixed to the frame by means of a chuck which is rotatably mounted on the supporting shaft and driven from an appropriate variable speed drive. The rotary knife of the machine is brought into cutting relation with the roll of material manually; and indexing mechanisms are provided whereby the entire knife head assembly may be moved step-wise along the length of the rotating roll to make successive cuts of predetermined width.

In using this type of machine, the operator takes the roll of material, which is supported on a core or sleeve of cardboard or like easily cut material, and first trims up one end face of the roll. Thereupon, the roll of material is placed on the supporting shaft or spindle, with the trimmed end face abutting against the clamping plate of the chuck which is intended to rotate the roll of material during the cutting operation. The chuck is connected to the roll of material by a series of clamping jaws or dogs which are mounted on the chuck for radial movement inwardly and outwardly. These clamping jaws or dogs include pointed elements which penetrate the outer periphery of the roll of material so as to rotate the roll and its core about the supporting shaft or spindle. Once the machine is set up, the operator, after appropriately adjusting the indexing mechanisms, manually moves the high speed rotary knife of the knife head assembly into contact with the turning roll until the knife cuts entirely through the roll and the supporting core to part a strip from the end of the roll remote from the previously trimmed end which abuts the chuck plate and is connected to and driven by the chuck. When the rotary knife is retracted to a clearance position relative to the roll, the entire knife head assembly is indexed toward the chucked end of the roll through a prescribed longitudinal traverse corresponding to the desired thickness of the cut strip and the knife head is again brought into progressive contact with the roll of material to cut the next strip therefrom. This operation is repeated until the entire roll is cut into strips. As the rotary knife approaches the chucked end of the roll, there is a pronounced tendency of the knife to pull the roll of material axially and in a direction away from the driving chuck. This pulling force, which becomes more pronounced as the chucked end of the roll is approached, manifests itself by causing the end face of the roll being cut to assume a somewhat conical taper, with the apex of the conically tapered end face contiguous to the core and longitudinally displaced along the core axis away from the chuck plate. The trimmed and chucked end of the roll is formed with a conical depression, with the apex of the cone substantially at the core. This may be attributed to the fact that the core and the contiguous inner plies of material have less resistance to the axial pulling force exerted by the knife and thereby are more easily displaced away from the chuck plate. In actual practice, this tendency makes it necessary for the operator to hold in on the end face of the roll remote from the chuck in an attempt to counteract the tendency of the inner portion of the roll to travel away from the chuck under the influence of the cutting knife. It is not uncommon to see an operator pushing with his hand against the core and the adjacent inner portion of the roll of material in the direction of the chuck to avoid coning of the roll of material. Further, it is often necessary for the operator, before taking the last few cuts from a roll to release the chuck, turn the roll end for end, trim up the previously trimmed face which is formed with the inwardly directed conical depression, again turn the roll end for end, reclamp the retrimmed roll of material, and thereafter take the last few cuts still bearing against the cut end face remote from the chuck to minimize the tendency of the roll to walk away from the chuck under the influence of the cutting knife. Obviously, the described procedure is time consuming, wasteful of material, and often results in cuts which are not uniform. Quite separate and apart from this, the necessity of having the worker achieve these additional manual operations in cutting up a roll of material virtually precludes the construction of a completely automatic rotary knife type of cutting machine since the retrimming operation is basically antagonistic to the attainment of an automatic system.

It is broadly an object of the present invention to provide improved means for rotating a roll of material in a rotary knife cutting machine which obviates one or more of the aforesaid difficulties. Specifically, it is within the contemplation of the present invention to provide an improved chuck for use with a roll of material wound on a core which is effective to turn the roll of material in a manner calculated to preclude axial displacement of the roll incident to the reaction of the knife during operation of the cutting machine.

In accordance with this aspect of the invention, my improved chuck for rotating a roll of material wound on a core and adapted to be supported on a shaft in a rotary knife cutting machine, comprises a chuck body having respective gripping means which are adapted to penetrate the roll adjacent to the core and adjacent to the outer periphery thereof for attaching the roll to the chuck body. Accordingly, in response to the drive of the chuck body, drive is imparted to the roll of material contiguous to the core and contiguous to the outer periphery thereof. Despite the relatively large axially displacing forces exerted on the roll by the knife, which displacing forces tend to cause the core and adjacent portions of the material to displace away from the chuck incident to cutting, experience with my improved chuck reveals that this tendency is substantially eliminated. Advantageously, with my improved chuck, it is possible to cut a roll of material into a series of tapes or strips of a prescribed width, from end to end, without the necessity of retrimming the roll and/or manually attempting to counteract the axial displacing forces incident to the cutting operation.

My improved mechanisms enable the clamping or chucking of a roll of material contiguous to its core and at its outer periphery without adversely affecting the roll of material or its supporting core (i.e. appreciably damaging the roll or splitting the core). Further, the requisite chucking force can be developed in a manner compatible with good machine practices in that it is not necessary to structurally undermine any portion of the machine to develop the requisite chucking force. Further, the chuck is exceptionally versatile in that it can accommodate rolls of varying diameters, whether supported on a tube terminating flush with the end face of the roll to be clamped or projecting beyond said end face.

In accordance with still further aspects of the present invention, the gripping or clamping elements contiguous to the core are in the form of a series of clamping jaws which are adapted to penetrate into the adjacent end face of the roll and to move toward each other thereafter whereby, after penetrating the material, the clamping jaws may be brought into firm clamping relation to the portion of the roll and core therebetween. Thus, a very reliable and secure hold is taken on the roll contiguous to the core for the purposes of imparting drive to the roll and counteracting the tendency of the core and the adjacent plies of material to translate away from the chuck incident to cutting.

The above brief description, as well as further objects, features and advantages of the present invention, will be more fully appreciated by reference to the following detailed description of several presently preferred embodiments of the invention, when taken in conjunction with the accompanying drawing, wherein:

Fig. 1 is an elevational view, with parts broken away and sectioned, showing my improved chuck on a typical rotary knife cutting machine, the chuck being connected to a roll of material carried on a core mounted on the supporting shaft or spindle of the machine;

Fig. 6 is an elevational view, with parts broken away and sectioned, of a simplified version of my improved chuck, the parts thereof being illustrated in detail in Figs. 2 to 4, inclusive;

Figure 5:
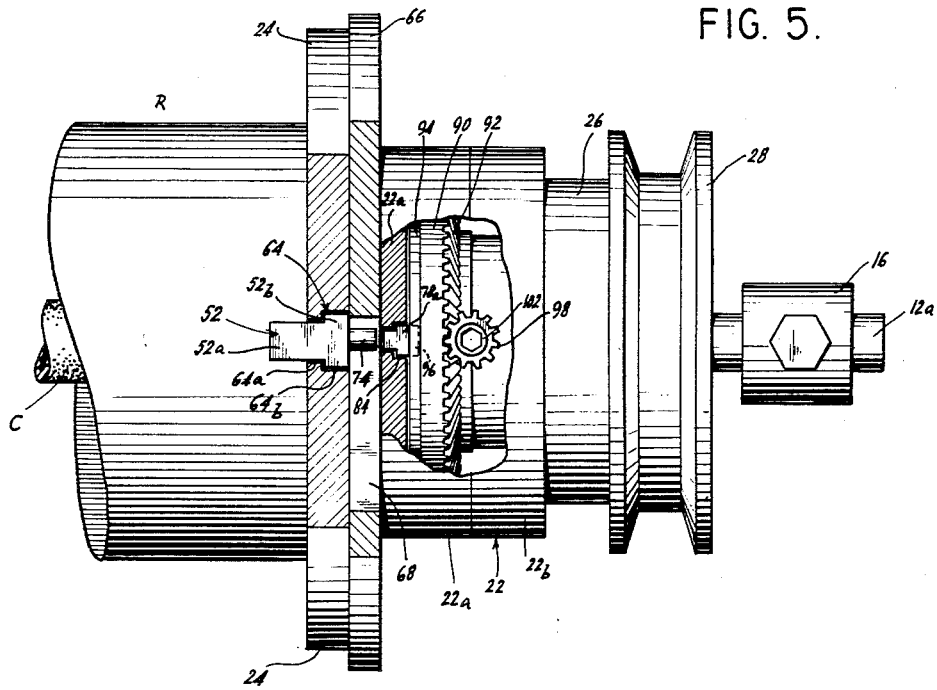
Fig. 5 is a plan view taken substantially along the line 5—5 of Fig. 2, looking in the direction of the arrows, parts being sectioned and broken away to expose the internal construction of the chuck.
Figure 8:
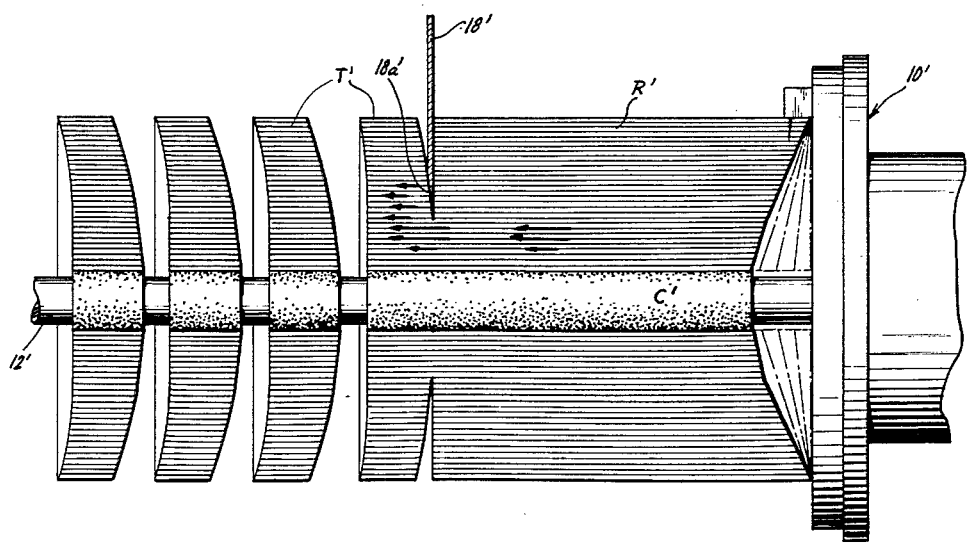

Fig. 7 is a transverse elevational view, with the supporting shaft in section, taken from the left of Fig. 5; and Fig. 8 is a sectional and diagrammatic showing illustrating the condition of the roll and core during a typical cutting cycle without provision for internally fixing the roll to the chuck, which condition can be simulated by removing the internal chucking jaws and the structure relating thereto.

Referring now specifically to the drawings, there is shown in Fig. 1 my improved chuck, generally designated by the reference numeral 10, which is to be employed in connection with a roll of material R wound on a core C which is received on the shaft 12 of the rotary knife cutting machine. In the interests of simplicity and clarity, the details of the rotating knife cutting machine, except for the supporting shaft or spindle 12, the supporting stanchions 14, 16 and the rotary knife 18 have been eliminated. For a detailed showing of a typical environment in which the improved chuck 10 is to be employed, reference may be made to my mentioned Patent No. 2,457,310 or to my copending application Serial No. 722,301, filed March 18, 1959 and entitled Cutting Machine. However, it is to be expressly understood that the machine of my issued patent and of my copending application are intended to be merely illustrative of the applications for the chuck 10; and the chuck will have further application in different types of rotary knife cutting machines, as will be apparent to those skilled in this art.

The chuck 10 includes a chuck body 20 which is rotatably journaled on the turned down end section 12a of the supporting shaft or spindle 12, as will be subsequently described. The chuck body 20 incorporates a bipartite housing 22 which carries at one of its sides a chuck plate 24 and at the other of its sides a spacer sleeve 26 and a driven pulley element 28. The chuck plate 24 is secured to the housing 22 by three machine screws 28 which are countersunk into the outer face 24a of the chuck plate and received within appropriate threaded bores 30 in the adjacent end face of the housing part 22a. The spacer sleeve 26 and the driven pulley element 28 are secured to the housing 22 by a series of machine bolts 32 which extend through the driven pulley element 28 are secured to the housing 22 by a series of machine bolts 32 which extend through the driven pulley element 28, inside of the spacer sleeve 26, and into appropriate threaded bolt receiving apertures 34 in the housing part 22b. The two housing parts 22a, 22b, which will be described in detail hereinafter, are secured together by a number of connecting bolts 36 which extend through the housing part 22b and are received in appropriate threaded apertures 38 formed in the adjacent confronting face of the housing part 22a.

The chuck body 20 is mounted on the turned-down end section 12a of the supporting shaft 12 for rotation by a pair of bearings 40, 42 separated by a spacer sleeve 44. Each of the bearings 40, 42 includes an inner race 40a, 42a, an outer race 40b, 42b and interposed ball bearings 40c, 42c. The bearing 40 is received within a circular seat 46 formed in the adjacent inner face of the driven pulley member 28. By an appropriate force fitting, the outer race 40b of the bearing 40 is attached to the driven pulley element 28 and for all intents and purposes may be considered to be integral therewith. The inner race 40a of the bearing 40 bears against the adjacent end face of the sleeve 44 which is fixed to the turned-down end section 12a of the support shaft 12 by a set screw 48 which extends into an appropriate tapped hole in the sleeve 44 and bears against the shaft section 12a. The bearing 42 is received within a circular seat 50 formed in the housing part 22a with the outer race 42b secured to the housing part 22a. The circular seat 50 is of a depth such that the inner face of the bearing 42 is flush with the inner side of the housing part 22a for abutment with the housing part 22b when these housing parts are assembled by means of the connecting bolts 36. By this arrangement, the chuck body 22 and the chuck components supported thereby are rotatable about the shaft section 12a, with the sleeve 44 and the inner bearing races 40a, 42a stationary.

The chuck plate 24 carries a series of circumferentially spaced clamping members or chuck jaws, designated by the reference numerals 52, 54 and 56, which are adapted to penetrate and grip the roll R at its outer periphery. The chuck or clamping jaws 52, 54 and 56 each embody a jaw body 52a, 54a and 56a of substantially T-shaped configuration (see Fig. 5) which carry on their inner side faces roll-penetrating pins 58, 60, 62. The T-shaped chuck jaws 52, 54, 56 are mounted on the chuck plate 24 for radial movement inwardly and outwardly relative to the supporting shaft 12 through the provision of radially-extending T-shaped guideways, such as the guideway 64 for the chuck jaw 52. The guideway 64 includes a narrow throat section 64a of a width substantially equal to the leg section 52a of the chuck jaw and a somewhat wider rear section 64b dimensioned to receive the cross head section 52b of the chuck jaw 52. Although not illustrated, the guideways for the remaining chuck jaws 54, 56 are identical in construction to the guideway 64 for the chuck jaw 52.

Figures 2, 3, 4:
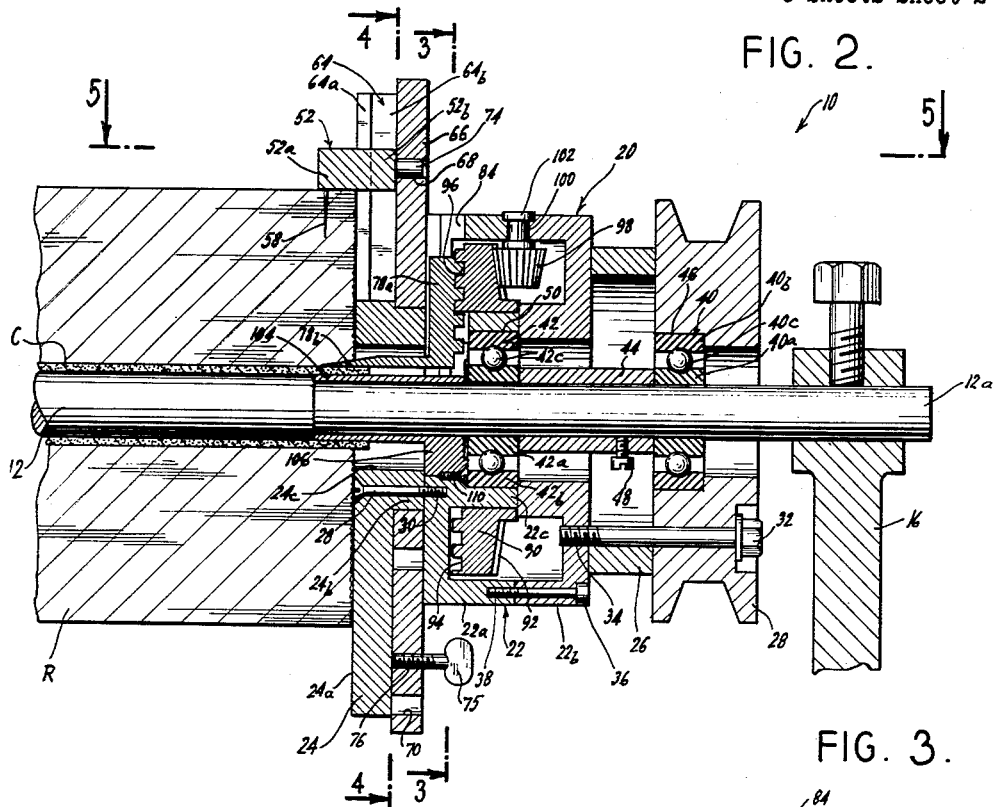
Fig. 2 is a longitudinal section through the chuck and the adjacent portions of the roll and core showing internal details of the chuck.
Fig. 3 is a transverse section through the chuck, taken substantially along the line 3—3 of Fig. 2 and looking in the direction of the arrows.
Fig. 4 is a transverse elevational view, with parts sectioned, taken substantially along the line 4—4 of Fig. 2 and looking in the direction of the arrows.

In order to simultaneously move the chuck or clamping jaws 52, 54 and 56 radially inwardly and outwardly of the chuck plate 24 for the purposes of clamping the roll R to the chuck and for releasing the same, a common actuator plate 66 is rotatably mounted on the chuck body 20. The common actuator plate 66 is interposed between the chuck plate 24 and the adjacent face of the housing part 22a and is journaled on an integral rearwardly directed hub 24b on the chuck plate 24. As seen in Fig. 2, the assembly is such that the actuator plate 66 confronts the rearward faces of the clamping jaws 52, 54, 56 to confine said jaws against rearward displacement from their accommodating T-shaped guideways. As seen in Fig. 4, the actuator plate 66 is provided with three arcuate camming slots 68, 70 and 72. Each of the slots is positioned in relation to the center of the actuator plate 66 as a progressively increasing spiral, with one end of the slot contiguous to the center of the plate and the other end of each slot contiguous to the outer periphery thereof. The slot 68 receives a rearwardly directed cam follower pin 74 carried on the clamping jaw 52; and the slots 70, 72 receive similar rearwardly directed cam follower pins projecting rearwardly from and carried on the clamping jaws 54, 56. Accordingly, in response to clockwise rotation of the actuator plate 66 (as viewed in Fig. 4), the chuck or clamping jaws 52, 54 and 56 move radially inwardly along the paths determined by their respective guideways 64; and in response to counterclockwise movement of the actuator plate 66, the respective clamping jaws will move radially outwardly and into clamping relation with the end of the roll R interposed therebetween and abutted against the outer or front face 24a of the chuck plate 24.

In order to lock the common actuator plate 66 in any position of its rotation, corresponding to a prescribed radial position of the several clamping jaws, a set screw 75 is mounted in an appropriate tapped hole 76 with its leading end in position to bear against the adjacent confronting face of the chuck plate 24. With the set screw 75 loosened, the adjustment may be made. Thereafter the actuator plate 66 is fixed in position by tightening down on the set screw.

Internally of the chuck 20, there is provided a further series of chuck members or clamping jaws, generally designated by the reference numerals 78, 80 and 82, which are adapted to penetrate the adjacent end face of the roll R and to clamp the roll R and core C to the chuck whereby drive is imparted to the roll internally thereof and contiguous to the core C. Each of the chuck or clamping jaws 78, 80, 82 includes an elongated body 78a, 80a and 82a or T-shaped cross section and forwardly projecting wedge-shaped fingers 78b, 80b and 82b which extend through a central through bore 24c provided in the chuck plate 24 and project beyond the front face 24a of the chuck plate 24. The projecting wedge-shaped fingers 78b, 80b and 82b will penetrate between the plies of the roll R at a location contiguous to the core C, the location of penetration being determined by the initial position of the jaws when the roll is brought against the chuck plate 24. The clamping jaws 78, 80 and 82 are mounted in complementary T-shaped guideways 84, 86 and 88 formed in the face of the housing part 22a which is directed toward the chuck plate 24. The guideways 84, 86, 88 are radially disposed to be substantially in alignment with the respective guideways 64 for the clamping jaws 52, 54, 56 on the chuck plate 24.

Disposed within the housing 20 is an actuating gear 90 which is journaled on an integral hub 22c of the housing part 22a which hub substantially surrounds the bearing 42. The actuating gear 90 is formed with bevel gearing 92 on the outer face thereof and a spiral worm gear 94 on the inner face thereof. The rearward side of each of the bodies 78a, 80a and 82a of the inner clamping jaws 78, 80, 82 are formed with respective worm segments 96 which are intermeshed with the spiral worm gearing 94. In response to turning of the actuating gear 90 in one direction, the clamping jaws 78, 80, 82 move outwardly in unison. In response to rotation of the gear 90 in the opposite direction, the clamping jaws 78, 80, 82 will move inwardly towards each other. The actuating gear 90 is turned by a driving bevel gear 98 which is in meshing engagement with the bevel gearing 92 on the outer face of the gear 90. The driving bevel gear is journaled on an upstanding stub shaft 100 with the head 102 thereof accessible externally of the housing 24 for manipulation by the operator.

Cooperating with the respective wedge-shaped fingers of the inner clamping jaws 78, 80, 82 is a clamping sleeve 104 which is of an internal diameter to be snugly received on the step-down or reduced diameter portion 12a of the supporting shaft 12 and is of an external diameter to form a substantial continuation of the main body of the supporting shaft 12. The clamping sleeve 104 terminated in about the same vertical plane as the projecting finger 78b, 80b and 82b and can be slipped into the core C when the roll of material is brought into abutment with the clamping plate 24. The clamping sleeve 104 has at its rearward end an integral flange 106 which is secured within a complementary bore or opening 108 formed in the housing part 22a by a series of machine screws 110. As seen best in Fig. 2, the clamping sleeve 104 is substantially coextensive with the internal clamping fingers, both extending through the fairly large diameter opening 24c formed within the chuck plate 24.

A typical sequence of operations will be described to facilitate a more thorough understanding of the present invention:

The worker takes the roll R of material and places the same on the supporting shaft 12. Thereupon, the roll R is advanced toward the chuck plate 24. During the last portion of this advance, the wedge-shaped fingers 78b, 80b and 82b axially penetrate between the plies of the roll material contiguous to the core C. Similtaneously the core C is slipped over the sleeve 104 which projects beyond the outer face 24a of the chuck plate 24. The location of axial penetration of the wedge-shaped fingers will, of course, be determined by the radial setting of these fingers as the roll R is brought against the chuck plate 24. If the worker desires to clamp very few plies of material and the core between the fingers and the sleeve 104, it is possible to initially adjust the fingers to a very small spacing relative to the sleeve 104. Experience will teach the skilled worker the optimum position for the axial penetration of the fingers. When the roll R is brought into abutment with the clamping plate, the actuator plate 66 is turned in a direction appropriate to bring the clamping jaws 52, 54 and 56 radially inwardly such that the roll-penetrating elements 58, 60, 62 enter the outer periphery of the roll R, as seen best in Fig. 2. The internal clamping jaws or fingers 78, 80, 82 are then radially displaced toward each other to grip the plies of material and the core C against the sleeve 104 by actuating the gear train 98, 90, 96. This completes the operations required to ready the machine for cutting the roll R into a series of cuts C of a prescribed width, as shown diagrammatically in Fig. 1.

Although the cuts T appear to be of generally conical configuration with a concave depression $t_1$ on the face thereof remote from the knife 18, and with a corresponding convex extension $t_2$ on the face thereof contiguous to the knife 18, it will be appreciated that the faces $t_1$ and $t_2$ are in substantial parallelism throughout their radial extent. Accordingly, when the cut T is flattened out (i.e. by being placed on a table), it will be of uniform dimension throughout its entire radial extent. This is quite unlike the result without provision for internally chucking the roll, as may be appreciated by considering the condition illustrated in Fig. 8, where the cuts T, as the chuck is approached, will each be of increasing width at locations approaching their respective cores.

In Fig. 8 there is shown diagrammatically a typical roll of material R' on a supporting shaft 12' employing a chuck 10' not having provision for penetrating and engaging the roll contiguous to the core C' thereof. The drawing exemplifies the action which occurred on a cutting machine using conventional prior art chucks which, from the standpoint of gripping may be compared with the instant chuck by removing the roll penetrating and engaging jaws 78, 80, 82 and the related mechanism.

As the knife 18' with the bevelled edge 18a' penetrates the roll of material at its outer periphery there is a displacement of the cut T' being taken in direction away from the chucked end of the roll. This displacement is brought about by the physical thickness of the knife, which may be of the order of 1/8 of an inch. The displaced material will cause the outer face of the cut being taken to begin to have a concave profile, with a corresponding convex profile on the inner face of the cut contiguous to the knife. In order to have a cut of uniform width, it is essential that the concave and convex outer and inner faces, respectively, be in substantial parallelism, that is, there should be no tendency of the material to translate past the plane of the knife 18' and in the direction of the cut T being taken. Normally, when working at a substantial distance from the chucked end of the roll R' and when toward the outer periphery of the roll where the clamping effect of the outer jaws or pins manifest themselves, the tendency of the cutting knife to displace the material away from the chucked end is overcome by the greater frictional resistance between the turns or plies of the roll. Accordingly, there is no material displacement into the cut T' being taken, and there is a reasonable assurance that the width of the cut will be constant from the outer periphery to the inner periphery thereof. Accordingly, a cut taken can be flattened out and calipered throughout its radial extent to determine that the width of the cut is substantially uniform.

As the core C' of the roll R' is approached in response to substantial penetration of the knife, there is correspondingly less force to counteract the tendency of the cutting knife to urge the material in the direction of the cut T', as indicated by the directional arrows in Fig. 8. It will be appreciated that the counteracting forces are a function of the radial penetration of the roll (that is, the distance inwardly from the outer clamping pins) and the spacing of the cut being taken from the chucked end of the roll. These counteracting forces are a function of the area of contact between plies at any radial penetration of the knife, measured from the plane of the cutting knife to the chucked end of the roll. As cuts are taken closer to the chucked end of the roll, a point will be reached where the counteracting forces provided by the friction between the plies of the roll is insufficient to hold back the material against feed across the cutting plane under the influence of the knife. When the hold back forces are insufficient, the bevel of the knife which acts on the portion of the roll being cut (said portion being connected to the portion of the roll which is to be cut) will tend to pull yet uncut portions of the roll in advance of the knife through the cutting plane and into the cut being taken. The result of this pulling tendency will be to cause the cut T' being taken to be of progressively increasing width as the core C' is approached, the increase in width being a function of the decrease in the hold back effect of the roll which is progressively diminishing as the core C' is approached. Actual experience indicates that these forces become substantial when approaching a cutting plane about six inches from the chuck. It will, of course, be appreciated that the hold back effect created by the resistance between the plies of material will in turn be a function of the type of material being cut. For example, if slicker materials are being cut, there will be less frictional resistance between successive plies. Other parameters also enter into the frictional resistance force, including the sharpness of the knife and the tightness of the roll.

Referring now specifically to Figs. 6 and 7, there is shown a modified form of my improved chuck, generally designated by the reference numeral 120, which is identical to the embodiment illustrated in Figs. 1 to 5, except for the arrangement of the jaws for clamping the outer periphery of the roll and the actuation of the jaws. In this embodiment, four chuck of clamping jaws 122, 124, 126 and 128 are mounted on the chuck plate 130 for movement radially inwardly and outwardly of the chuck plate 130. Each of the jaws includes a jaw body 122a, 124a, 126a, 128a of generally T-shaped configuration, respectively mounted in complementary T-shaped guideways 132, 134, 136, 138 provided in the chuck plate 130. Each of the jaws may be independently moved to a prescribed position of adjustment and thereafter locked in place through the provision of an appropriate clamping screw (i.e. clamping screw 140) which is received within a tapped hole in the chuck plate at the rear side of the corresponding guideway (i.e. guideway 132).

Internally the chuck is provided with a series of three clamping jaws 142, 144 and 146 which are identical in construction to the clamping jaws 78, 80 and 82 and are mounted and actuated by identical mechanisms. Accordingly, further description of the jaws 142, 144 and 146 will be dispensed within the interests of brevity. As seen in Fig. 7, the three jaws 142, 144, 146, are spaced at 120° relative to each other. However, it will be appreciated that four inner clamping jaws may be provided for penetrating the roll contiguous to the core, which jaws could be arranged in the same angular positions as the outer clamping jaws 122, 124, 126 and 128.

The simplified chuck 120 is mounted on the turned-down end section 12a of the shaft 12 of the cutting machine as previously described and is used substantially in the same fashion. However, with the simplified chuck 120 the operator must individually bring the respective clamping jaws 122, 124, 126 and 128 radially inwardly into the position wherein the corresponding pins penetrate the outer periphery of the roll. In such position the operator locks the individual jaws in place by manipulation of the associated locking or clamping screw 140. The simplified chuck illustrated in Figs. 6 and 7 will find application in cutting machines where price is a paramount consideration and wherein the purchaser is not particularly desirous of the extra convenience of being able to simultaneously manipulate the several outer clamping jaws.

Although the invention herein has been illustrated with structure including three inner and either three or four outer clamping jaws, it will be appreciated that other jaw arrangements are within the contemplation of the invention. In some instances more than four jaws at circumferential spacings of 90° may be required to chuck the roll of material in the cutting machine. Numerous other variations and changes will occur to those skilled in the art, and in some instances some features of the invention may be used without a corresponding use of other features of the invention. Accordingly, it is appropriate that the claims are construed in the manner consistent with the manner and scope of the contribution herein.

What I claim is:

1. An improved chuck for use with a roll of material carried on a core and adapted to be supported on a shaft comprising a chuck body, bearing means operatively connected to said chuck body and adapted to be engaged with said shaft for journaling said chuck body on said shaft, first roll gripping and penetrating means carried by said chuck body and spaced radially outwardly of said shaft and extending substantially longitudinally thereof to engage and penetrate said roll of material contiguous to said core for connecting said roll and core to said chuck body, said first roll gripping and penetrating means including two coacting gripping members both disposed on the same side radially of the longitudinal axis of said shaft and adapted to extend into the adjacent end of said roll and means mounting one of said gripping members for movement relative to the other of said gripping members, actuating means operatively connected to said one gripping member for moving said one gripping member toward said other gripping member such that after said gripping member penetrates said roll of material said one gripping member may be moved toward said other gripping member to clamp the portion of said roll of material therebetween, and second roll gripping and penetrating means carried by said chuck body and adapted to engage said roll of material contiguous to its outer periphery for connecting said roll to said chuck body whereby drive is imparted to both said core and said roll of material in response to rotation of said chuck body.

2. An improved chuck for use with a roll of material carried on a core and adapted to be supported on a shaft comprising a chuck body, bearing means operatively connected to said chuck body and adapted to be engaged with said shaft for journaling said chuck body on said shaft for rotation about said shaft, drive means operatively connected to said chuck body for rotating said chuck body, first roll gripping and penetrating means carried by said chuck body and spaced relative to said shaft and extending substantially longitudinally thereof to longitudinally penetrate said roll of material contiguous to said core for connecting said core and roll to said chuck body, said first roll gripping and penetrating means including two coacting gripping members both disposed on the same side radially of the longitudinal axis of said shaft and adapted to extend into the adjacent end of said roll and means mounting one of said gripping members for movement relative to the other of said gripping members, actuating means operatively connected to said one gripping member for moving said one gripping member toward said other gripping member such that after said gripping member penetrates said roll of material said one gripping member may be moved toward said other gripping member to clamp the portion of said roll of material therebetween, and second roll gripping and penetrating means carried by said chuck body and adapted to engage said roll of material contiguous to its outer periphery for connecting said roll to said chuck body whereby drive is imparted to both said core and said roll of material in response to rotation of said chuck body.

3. In combination, a shaft adapted to receive a roll of material carried on a core, and a chuck for rotating said roll of material comprising a chuck body, bearing means operatively connected to said chuck body and supported on said shaft for journaling said chuck body on said shaft for rotation, drive means operatively connected to said chuck body for rotating said chuck body, first roll gripping and penetrating means carried by said chuck body and adapted to engage said roll of material contiguous to said core for connecting the inner portion of said roll of material to said chuck body, said first roll gripping and penetrating means including two coacting gripping members both disposed on the same side radially of the longitudinal axis of said shaft and adapted to extend into an end of said roll of material on said core and means mounting one of said gripping members for movement toward the other of said gripping members, actuating means operatively connected to said one gripping member for moving said one gripping member toward said other gripping member such that after said gripping member penetrates said roll of material said one gripping member may be moved toward said other gripping member to clamp the portion of said roll of material therebetween, and second roll gripping and penetrating means carried by said chuck body and adapted to engage said roll of material contiguous to its outer periphery for connecting the outer portion of said roll of material to said chuck body whereby drive is imparted to both said inner and outer portions of said roll of material in response to rotation of said chuck body.

4. In a rotary knife cutting machine, a shaft adapted to receive a roll of material carried on a core, and a chuck for rotating said roll of material comprising a chuck body, bearing means operatively connected to said chuck body and supported on said shaft for journaling said chuck body on said shaft, first roll-contacting means carried by said chuck body and adapted to engage said roll of material contiguous to said core for connecting the inner portion of said roll of material to said chuck body, and second roll-contacting means carried by said chuck body and adapted to engage said roll of material contiguous to its outer periphery for connecting the outer portion of said roll of material to said chuck body whereby drive is imparted to both said inner and outer portions of said roll of material in response to rotation of said chuck body, said first roll-contacting means including plural pairs of clamping jaws adapted to axially penetrate into an end face of said roll of material, each of said pairs including an inner and outer clamping jaw disposed at the same side radially of the longitudinal axis of said shaft, and actuating means operatively connected to and mounting said outer clamping jaws for simultaneous movement toward said shaft whereby, after penetration of said plural pairs of clamping jaws into said roll of material, said outer clamping jaws may be moved toward said shaft into clamping relation relative to the portion of said roll intermediate said plural pairs of clamping jaws.

5. In a rotary knife cutting machine, a shaft adapted to receive a roll of material carried on a core, and a chuck for rotating said roll of material comprising a chuck body, bearing means operatively connected to said chuck body and supported on said shaft for journaling said chuck body on said shaft, first roll-contacting means carried by said chuck body and spaced relative to said shaft to longitudinally penetrate said roll of material contiguous to said core for connecting the inner portion of said roll of material to said chuck body, said first roll-contacting means including a pair of material-penetrating elements disposed at the same side radially of the longitudinal axis of said shaft and means mounting one of said material-penetrating elements for gripping movement having a motion component radially of said shaft whereby said material-penetrating elements may be brought into gripping engagement with the portion of said roll inwardly of the location at which said material-penetrating elements longitudinally penetrate said roll, actuating means operatively connected to said material-penetrating elements for simultaneously moving said material-penetrating elements through said motion component radially of said shaft, and second roll-contacting means carried by said chuck body and adapted to engage said roll of material contiguous to its outer periphery for connecting the outer portion of said roll of material to said chuck body whereby drive is imparted to both said inner and outer portions of said roll of material in response to rotation of said chuck body, said second roll-contacting means including a series of clamping jaws adapted to engage the outer periphery of said roll of material, and means operatively connected to said clamping jaws for simultaneously moving said clamping jaws into engagement with the outer periphery of said roll of material.

6. A chuck for use in a rotary knife cutting machine of the type including a shaft adapted to receive a roll of material carried on a core, said chuck being adapted to rotate said roll of material and comprising a chuck body, having a chuck plate, bearing means operatively connected to said chuck body and adapted to be supported on said shaft for journaling said chuck body on said shaft, first roll-contacting means carried by said chuck body outwardly of said shaft and including roll-penetrating wedges both disposed at the same side radially of the longitudinal axis of said shaft and extending substantially lengthwise of said chuck body and adapted to penetrate an end face of said roll of material contiguous to and outwardly of said core for connecting the inner portion of said roll of material to said chuck body, means mounting said roll-penetrating wedges for gripping movement relative to said roll, said gripping movement including a motion component which is radial and inward relative to said roll whereby said roll-penetrating wedges may be moved toward each other to grippingly engage the inner portion of said roll intermediate said roll-penetrating wedges, actuating means operatively connected to said roll-penetrating wedges for simultaneously moving said roll-penetrating wedges through said motion component which is radial and inward relative to said roll, and second roll-contacting means carried by said chuck plate and including roll-penetrating pins extending radially of said chuck body and adapted to engage said roll of material at its outer periphery for connecting the outer portion of said roll of material to said chuck body whereby drive is imparted to both inner and outer portions of said roll of material in response to rotation of said chuck body.

7. A chuck for use in a rotary knife cutting machine of the type including a shaft having a main section adapted to receive a roll of material carried on a core and a turned down end section, said chuck being adapted to be supported on said end section and rotate said roll of material and comprising a chuck body having a chuck plate, bearing means operatively connected to said chuck body and adapted to be supported on said end section of said shaft for journaling said chuck body on said shaft, a core-penetrating sleeve adapted to be supported on said end section and dimensioned to form a substantial continuation of said main section of said shaft, said sleeve being fixed to said chuck body and being adapted to rotate within the adjacent end of said core, roll-gripping means carried by said chuck body and including roll-penetrating wedges extending lengthwise of said chuck body and positioned to penetrate the adjacent end face of said roll of material contiguous to and outwardly of said core, and means operatively connected to said roll-penetrating wedges for moving same toward said sleeve and into gripping engagement with the end portion of said roll and core intermediate said roll-penetrating wedges and said sleeve for connecting the inner portion of said roll of material to said chuck body.

8. A chuck for use in a rotary knife cutting machine of the type including a shaft having a main section adapted to receive a roll of material carried on a core and a turned down end section, said chuck being adapted to be supported on said end section and rotate said roll of material and comprising a chuck body having a chuck plate, bearing means operatively connected to said chuck body and adapted to be supported on said end section of said shaft for journaling said chuck body on said shaft, a core-penetrating sleeve adapted to be supported on said end section and dimensioned to form a substantial continuation of said main section of said shaft, said sleeve being fixed to said chuck body and being adapted to rotate within the adjacent end of said core, first roll-gripping means carried by said chuck body and including roll-penetrating wedges extending lengthwise of said chuck body and positioned to penetrate the adjacent end face of said roll of material contiguous to and outwardly of said core, means operatively connected to said roll-penetrating wedges for moving same toward said sleeve and into gripping engagement with the end portion of said roll and core intermediate said roll-penetrating wedges and said sleeve for connecting the inner portion of said roll of material to said chuck body, and second roll-gripping means carried by said chuck plate and including roll-penetrating pins extending radially of said chuck body and adapted to engage said roll of material at its outer periphery for connecting the outer portion of said roll of material to said chuck body whereby drive is imparted to both said inner and outer portions of said roll of material in response to rotation of said chuck body.

9. A chuck for use in a rotary knife cutting machine of the type including a shaft adapted to receive a roll of material carried on a core, said chuck being adapted to rotate said roll of material and comprising a chuck body having a chuck plate, bearing means operatively connected to said chuck body and adapted to be supported on said shaft for journaling said chuck body on said shaft, roll-gripping and penetrating means carried by said chuck body, said roll-gripping and penetrating means including at least two coacting gripping members on said chuck body, one of said gripping members being positioned relative to said shaft to extend into said core adjacent one end face of said roll, the other of said gripping members being positioned relative to said shaft to longitudinally penetrate said roll at said one end face outwardly of said core, and means mounting said other gripping member for movement toward said one gripping member such that after penetration, said other gripping member may be moved toward said one gripping member to clamp the portion of said roll and core intermediate said gripping members to said chuck body.

10. A chuck for use in a rotary knife cutting machine of the type including a shaft adapted to receive a roll of material carried on a core, said chuck being adapted to rotate said roll of material and comprising a chuck body having a chuck plate, bearing means operatively connected to said chuck body and adapted to be supported on said shaft for journaling said chuck body on said shaft, first roll-gripping and penetrating means carried by said chuck body, said first roll-gripping and penetrating means including at least two coacting gripping members on said chuck body, one of said gripping members being positioned relative to said shaft to extend into said core adjacent one end face of said roll, the other of said gripping members being positioned relative to said shaft to longitudinally penetrate said roll at said one end face outwardly of said core, and means mounting said other gripping member for movement toward said one gripping member such that after penetration said other gripping member may be moved toward said one gripping member to clamp the portion of said roll and core intermediate said gripping members to said chuck body, and second roll-gripping and penetrating means carried by said chuck plate and including roll-penetrating pins extending radially of said chuck body and adapted to engage said roll of material at its outer periphery for connecting the outer portion of said roll of material to said chuck body whereby drive is imparted to both said inner and outer portions of said roll of material in response to rotation of said chuck body.

11. A chuck for use in a rotary knife cutting machine of the type including a shaft having a main section adapted to receive a roll of material carried on a core and a turned down end section, said chuck being adapted to be supported on said end section and rotate said roll of material and comprising a chuck body having a chuck plate, bearing means operatively connected to said chuck body and adapted to be supported on said end section of said shaft for journaling said chuck body on said shaft, a core-penetrating sleeve adapted to be supported on said end section and dimensioned to form a substantial continuation of said main section of said shaft, roll-gripping means carried by said chuck body and including roll-penetrating elements extending lengthwise of said chuck body and adapted to penetrate the adjacent end face of said roll of material contiguous to and outwardly of said core, means operatively connected to said roll-penetrating elements for mounting same for movement toward said sleeve and into gripping engagement with the end portion of said roll and core intermediate said roll-penetrating elements and said sleeve for connecting the inner portion of said roll of material to said chuck body, and actuating means operatively connected to said roll-penetrating elements for effecting said gripping engagement.

12. A chuck for use in a rotary knife cutting machine of the type including a shaft having a main section adapted to receive a roll of material carried on a core and turned down end section, said chuck being adapted to be supported on said end section and rotate said roll of material and comprising a chuck body having a chuck plate, bearing means operatively connected to said chuck body and adapted to be supported on said end section of said shaft for journaling said chuck body on said shaft, a core-penetrating sleeve adapted to be supported on said end section and dimensioned to form a substantial continuation of said main section of said shaft, first roll-gripping means carried by said chuck body and including roll-penetrating elements positioned to penetrate the adjacent end face of said roll of material contiguous to and outwardly of said core, means operatively connected to said roll-penetrating elements for moving same toward said sleeve and into gripping engagement with the end portion of said roll and core intermediate said roll-penetrating elements and said sleeve for connecting the inner portion of said roll of material to said chuck body, and second roll-gripping means carried by said chuck plate and including roll-penetrating pins extending radially of said chuck body and adapted to engage said roll of material at its outer periphery for connecting the outer portion of said roll of material to said chuck body whereby drive is imparted to both said inner and outer portions of said roll of material in response to rotation of said chuck body.

13. A chuck for use in a rotary knife cutting machine of the type including a shaft adapted to receive a roll of material carried on a core, said chuck being adapted to rotate said roll of material and comprising a chuck body having a chuck plate, bearing means operatively connected to said chuck body and adapted to be supported on said shaft for journaling said chuck body on said shaft, first roll gripping and penetrating means carried by said chuck body, said first roll gripping and penetrating means including at least two coacting gripping members on said chuck body, one of said gripping members being positioned relative to said shaft to extend into said core adjacent one end face of said roll, the other of said gripping members being positioned relative to said shaft to longitudinally penetrate said roll at said one end face outwardly of said core, and means mounting one of said gripping members for movement toward the other of said gripping members such that after penetration, the movable one of said gripping members may be moved toward the other of said gripping members to clamp the portion of said roll and core intermediate said gripping members to said chuck body.

14. A chuck for use in a rotary knife cutting machine of the type including a shaft adapted to receive a roll of material carried on a core, said chuck being adapted to rotate said roll of material and comprising a chuck body having a chuck plate, bearing means operatively connected to said chuck body and adapted to be supported on said shaft for journaling said chuck body on said shaft, first roll-gripping and penetrating means carried by said chuck body, said first roll-gripping and penetrating means including at least two coacting gripping members on said chuck body, one of said gripping members being positioned relative to said shaft to extend into said core adjacent one end face of said roll, the other of said gripping members being positioned relative to said shaft to longitudinally penetrate said roll at said one end face outwardly of said core, and means mounting one of said gripping members for movement toward the other of said gripping members such that after penetration, the movable one of said gripping members may be moved toward the other of said gripping members to clamp the portion of said roll and core intermediate said gripping members to said chuck body, and second roll gripping and penetrating means carried by said chuck plate and including roll-penetrating pins extending radially of said chuck body and adapted to engage said roll of material at its outer periphery for connecting the outer portion of said roll of material to said chuck body whereby drive is imparted to both said inner and outer portions of said roll of material in response to rotation of said chuck body.

References Cited in the file of this patent

UNITED STATES PATENTS

| Number | Name | Date |
|---|---|---|
| 878,705 | Adams | Feb. 11, 1908 |
| 1,352,376 | Oppenheimer | Sept. 7, 1920 |
| 1,814,699 | Hubbell | July 14, 1931 |
| 1,892,058 | Judelshon | Dec. 27, 1932 |
| 1,952,209 | Judelshon | Mar. 27, 1934 |
| 2,337,274 | Ruf | Dec. 21, 1943 |
| 2,457,310 | Judelshon | Dec. 28, 1948 |
| 2,757,009 | Sloan | July 31, 1956 |